(12) United States Patent
Verdonck

(10) Patent No.: US 7,636,460 B2
(45) Date of Patent: Dec. 22, 2009

(54) METHOD OF STRAIGHTENING A REFORMAT FOR NAVIGATION AND QUANTIFICATION

(75) Inventor: Bert Leo Alfons Verdonck, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 663 days.

(21) Appl. No.: 10/525,174

(22) PCT Filed: Jul. 31, 2003

(86) PCT No.: PCT/IB03/03384

§ 371 (c)(1),
(2), (4) Date: Feb. 22, 2005

(87) PCT Pub. No.: WO2004/021284

PCT Pub. Date: Mar. 11, 2004

(65) Prior Publication Data

US 2006/0056675 A1    Mar. 16, 2006

(30) Foreign Application Priority Data

Aug. 27, 2002 (EP) .................................. 02078538

(51) Int. Cl.
*G06K 9/00* (2006.01)
*G01N 23/223* (2006.01)

(52) U.S. Cl. .................... 382/128; 382/154; 378/46

(58) Field of Classification Search ............... 382/100, 382/107, 128, 129, 130, 131, 132, 133, 154, 382/168, 181, 199, 203, 219, 224, 232, 254, 382/257, 274, 276, 291, 305, 295–298; 378/16, 378/46; 600/407
See application file for complete search history.

(56) References Cited

U.S. PATENT DOCUMENTS

| | | | |
|---|---|---|---|
| 6,928,314 B1 * | 8/2005 | Johnson et al. | 600/407 |
| 6,973,158 B2 * | 12/2005 | Besson | 378/16 |
| 7,116,749 B2 * | 10/2006 | Besson | 378/16 |
| 7,274,810 B2 * | 9/2007 | Reeves et al. | 382/128 |
| 7,298,878 B2 * | 11/2007 | Goto | 382/128 |
| 2003/0060698 A1 * | 3/2003 | Mistretta | 600/410 |

FOREIGN PATENT DOCUMENTS

WO    WO0137219 A1    5/2001

* cited by examiner

*Primary Examiner*—Seyed Azarian

(57) ABSTRACT

A method of producing an improved straightened reformat is presented in which cross sections are calculated perpendicular to an elongate subject described within an object data set, a reference direction is determined in each cross sectional slice and a new object data set is created by concatenating the cross sectional slices, each cross sectional slice orientated so that the reference directions in the cross sectional slices are aligned. Various methods are presented by which the reference direction is determined within each cross sectional slice, including propagation from an original reference direction and optimization using determined reference directions as boundary conditions.

20 Claims, 5 Drawing Sheets

METHOD OF STRAIGHTENING A REFORMAT FOR NAVIGATION AND QUANTIFICATION

The invention relates to a method for producing an object data set describing a straightened reformat from an original object data set containing an elongate subject, from which an initial cross sectional slice is created transverse to the elongate subject and at least one further cross sectional slice is created transverse to the elongate subject.

The clear visualization of complex and tortuous structures within a three dimensional object data set is a difficult problem within imaging. Medical imaging in particular contains many examples of tortuous objects. Arteries, veins, nerves and the lower digestive tract are all examples of structures which present with a large degree of tortuosity in relation to the surrounding tissue. This inherent anfractuosity presents difficulty when these structures are displayed following the use of traditional imaging methods.

Modern imaging allow the viewing of 3 dimensional object data on a 2 dimensional computer screen or some other display device. For practical purposes, a display device includes a hard copy of an image such as an X-ray film or a print out. The data is usually the output of an imaging procedure, e.g. computed tomography, magnetic resonance imaging, ultrasound, and contains information for the quantification and qualification of the object under examination. The inherent limitations of a 2 dimensional screen constrict the display of information to flat images, but a variety of techniques are commonly employed to maximize the utility of these images. While volume data has been traditionally shown as a series of 2 dimensional slices, the technique of volume rendering, for example, allows a 3 dimensional object to be displayed as a projection onto the 2 dimensional screen while including features which are redolent of a solid object. These features, such as shading to indicate a solid surface, or partial shading to indicate a block of solid structure, give the impression of a spatially extended object and trick the eye of the viewer into interpreting the flat projection as a 3 dimensional shape.

Volume rendering, as applied to tortuous objects set within a wider volume of tissue, can highlight the position of the twisting object within the tissue. Commonly, the tortuous object under inspection can be rendered as solid within a surrounding tissue volume which must by necessity be rendered at least partially transparent to allow the visualization of the immanent flexuous structure. The extent of the winding and twisting structure can then be seen. However, the entire volume of tissue, including any anatomical ambages is usually only viewed from one direction, the direction which is presented on the screen. Any irregularities, variations in diameter and rapid curving of the structure along its axis are likewise viewed from the same direction and an unrepresentative distortion of the visual information can ensue, depending on the direction of projection. In particular, narrowings or widenings of a tubular tortuous structure, which may be indicative of an underlying disease process, may be rendered unclear.

In part the problem of how to analyze narrowings and widenings within some tubular structure can be solved by always reconstructing the object along one of its natural axes. For example, a narrowing along a large, straight artery will be clearly visible in a 2 dimensional slice which includes the length of the artery. Unfortunately, this is not a viable option when the artery, or other structure, is ambagious. The inherent tortuosity of such a structure makes it extremely difficult to present the 3 dimensional image information into planes which clearly expose a sufficient length of the structure to accurately recognize the existence of narrowing or widening. Because of the twisting nature of the tortuous structure, it twists in and out of any 2 dimensional plane that is reconstructed. Trying to track the entire length of the structure becomes time consuming and laborious as more and more 2 dimensional planes are reconstructed at an ever greater range of positions and angles within the original object data set.

In part the problem of viewing twisting, tortuous structures has been solved by a method of reconstruction known as straightened reformatting, in which a three dimensional object data set containing image data representing a tortuous structure can be reformatted to produce a further image in which the twisting structure is displayed in a straightened conformation. The tortuous structure is presented on the screen as though it has been gripped at both ends and pulled straight. Any inherent tortuosity is therefore removed. A method of achieving this is presented in WO 01/37219 A1. This discloses a method in which volumetric images are reformatted into rectilinear data by isolating the tortuous structure within the volumetric data, determining the axis of the structure and constructing planes at selected points along this axis. The volumetric data is then reformatted along these planes and the final image reconstituted from the sequence of plane images.

However, when a new data set is made by simply reconstructing cross sectional slices at intervals and then assembling the slices to create a new block of data there will be small discontinuities in the resulting image derived from the new data set.

It is an object of the invention to produce a straightened reformat which reduces discontinuities in the array of data in the new object data set. This is achieved according to the method of our invention which is characterized in that, a reference direction is determined in each cross sectional slice, and the object data set is created by concatenating the cross sectional slices, each cross sectional slice orientated so that the reference directions in the cross sectional slices are aligned. Further, a computer program may be provided containing instructions for the production of the straightened reformat from successive cross sectional slices from within the object data set. For example the computer program contains instructions for a reference direction to be determined within each cross sectional slice, and further instructions for the cross sectional slices to be aligned by alignment of the individual reference directions. Likewise, a workstation may be provided for producing, displaying and using images, and containing instructions for the production of the straightened reformat from successive cross sectional slices from within the object data set. For example, the instructions may cause a reference direction to be determined within each cross sectional slice, and the cross sectional slices to be aligned by alignment of the individual reference directions.

Cross sectional slices of data can be calculated and produced in an object data set at any angle within the volume represented by the data set. The general method of straightened reformatting rests on an assumption that cross sectional slices made at orientations which are perpendicular to the tortuous structure and then stacked one on top of each other will, if they include the tortuous structure at the same position within each slice, produce a new object data set in which the data points describing the tortuous structure are collected together in such a way that the display of the new data set produces an image of the material in the tortuous structure in a locally defined volume. This locally defined volume is a straight line, or tube.

The cross sectional slices used to sample the data points describing the tortuous structure within the block of tissue can be constructed in several ways. One such way is disclosed in document WO 01/37219 A1, but alternative methods exist. Most other methods are based on the initial identification of the axis of the structure and there are several known techniques for identifying this axis. As an example, one method which is applicable to a tubular structure involves segmenting the length of the tube from the surrounding tissue and then incrementally 'thinning' the diameter of the tube until only the axis remains.

The result of any of these cross sectional sampling methods is a series of such slices, each including a cross section of the tortuous structure which is essentially perpendicular to the slice throughout the length along which it intersects that slice. As long as each cross sectional slice remains centered on the tortuous structure as it is calculated in the object data set, the included section of tortuous structure remains in the center of each cross sectional slice. When they are finally stacked, these cross sectional slices produce a new object data set which contains some of the original information describing the original tissue volume, but orientated in a new way. The successive portions of the tortuous structure, each contributed from a different cross sectional slice, reformulate the tortuous structure into a straight structure.

A reference direction can be determined in each cross section. This reference direction is a mathematical construct which defines an orientation within each calculated cross section. As such, the reference direction can be imagined as running from the cross sectional portion of the original anfractuous structure contained in the center of the calculated cross section, outwards towards the edge of that cross section of data. In doing so, it can be imagined as forming a direction in which the cross section can point, or be orientated. Such a reference direction as described allows the assembly of cross sections to be orientated within the new object data set in a reproducible and unambiguous way.

If the consecution of cross sections is formed into a stack, with the centers of the cross sections containing the portions of the tortuous structure lined up in one axial direction, then the reference directions will all extend radially outwards from this axial center. These reference directions now provide a mode in which the various cross sections in the stack, or catena, can become aligned, or orientated, with respect to each other.

According to the invention, just such a catena of cross sections is formed and the array of cross sections individually rotated until all the reference directions are pointing along the same angular direction about the central radial axis. This aligns the various cross sections into a specific conformation. The reference directions, once determined in each cross sectional slice, remain fixed in direction.

The reference directions could be determined in some random pattern, but this would result in a random correlation of slice orientations. Alternatively, known mathematical descriptions could be used to produce a set of reference directions, for example, the Frenet frame, which provides a mathematical description of a 3 dimensional curve in terms of 3 orthogonal vectors may be used to provide each cross section with a reference vector related to the curvature and tortuosity of the central axis. The set of these vectors, one for each slice, would then constitute the necessary reference directions. Alignment of the cross sections would then proceed according to the rest of the invention. However, mathematical methods have their own inherent limitations, for example the classic Frenet reference system produces a set of vectors which can accurately describe a twisting curve but which may contain discontinuities between themselves as a result of that very tortuosity they seek to describe. Details of these vectors and their calculation can be found in advanced mathematical texts and also in Ph.D. thesis 'Blood vessel segmentation, quantification and visualization for 3D MR and spiral CT angiography' by Bert Verdonck, presented on 28 Oct. 1996, Ecole Nationale Supérieure des Télécommunications.

Instead, according to one aspect of the invention, an initial reference direction is determined in the initial cross section and then used as the basis for determining the successive reference directions in the following cross sections.

This subsequent derivation of further reference directions can be achieved in several ways. In one implementation of the invention, this initial reference direction is propagated into each of the subsequent cross sections. As such, the original orientation of the first reference direction is transferred mathematically onto each of the further cross sections, taking into account the relative orientation of the two cross sections with respect to each other. This is repeated for each pairing of a further cross section with the initial cross section. This propagation can mathematically occur in a variety of ways, the main point being to achieve a set of new reference directions, each one in a different cross sectional slice, by which the slices can be aligned.

A simple mathematical example can serve as an illustration of how this is achieved in practice. The curve which constitutes the axis of the tortuous structure is described at all points by a tangent vector which identifies the direction in which the curve moves. The positions at which cross sections cross this curve describe a series of points along this curve and for any of these points a reference direction can be found which is perpendicular to the tangent at that point. This reference direction can be transferred mathematically to the next point along the curve and repositioned there. At this next point the translated reference direction simply describes an orientation in space and will not reside in the cross section which coincides with the next point along the curve if the line describing the curve has deviated in any way from the previous tangential direction. However, the translated reference direction can be propagated into this adjoining cross section if a method can be found of changing the direction in which it points without losing the connection between the original and resultant directions.

This can be achieved if a third direction is defined perpendicular to the tangent vector at the new point. Any line which is itself perpendicular to the second tangent can take any one of $2\pi$ orientations about the tangent because the line can sweep out a plane while remaining perpendicular to the tangent. If an orientation is now defined by defining another plane, one which contains the tangent, we can forge a direction for the third line by stipulating that it be perpendicular to this plane. Such a plane is formed by the direction of the tangent and the previous point on the curve of the axis. Alternatively, an equally viable, but different plane, would be formed by the new point on the curve and the previous tangent direction. In both cases a new plane is defined which cuts through the point on the curve to which the original reference direction has been translated. It is now possible to construct a straight line which traverses this plane at the new point. The new reference direction in the new cross section is now produced by mathematically rotating the translated reference direction around this new line until it resides fully within the cross section. This orientation within the cross section constitutes the new reference direction.

This process may be repeated for all subsequent cross sections throughout the entire array of cross sections.

There are other known mathematical ways in which a reference direction in any one plane may be propagated in any other plane. For example, further examples are given in 'Blood vessel segmentation, quantification and visualization for 3D MR and spiral CT angiography'.

In an alternative implementation, the reference direction in the initial cross sectional slice is propagated into the following slice to create a new reference direction, and this new direction is then propagated into the slice following that to make the subsequent reference direction. This process is repeated throughout the continuation of slices until all slices have an associated reference direction. In this variation of the method there is a closer relationship between each reference direction and the reference direction in the following slice. The process of stacking the slices and aligning them according to the reference directions can then proceed as normal.

A different embodiment for setting the reference direction in each cross sectional slice is also possible. In this further aspect of the invention both an first and a final cross section can be chosen from the full group of cross sections and a reference direction determined in each. These two determined reference directions are then taken to act as constraints on the set of intermediate reference directions. The intermediate reference directions can then be derived using the first and final reference directions as end points, and in such a way that the change of orientation of the reference directions is optimized along the curve between the first and final reference directions. This avoids discontinuities from one cross sectional slice to another in the reconstructed straightened reformat.

This can be achieved in practice as follows. The technique is applicable to a reconstruction of a straightened reformat over a continuous length of tortuous structure in which a first and a final cross section can be determined. These may not necessarily be the original initial and final cross sections of the entire new object data set describing the straightened reformat. The constraining reference directions are chosen or determined in the first and final cross sectional slices and an integral minimization is performed over the intervening reference directions by integrating the changes in reference direction orientation over the entire collection of reference directions and minimizing the resultant integral value. Numerical solutions are known in the art by which this can be achieved. The result is an overall set of reference directions which change minimally in orientation across the length of the reconstructed structure.

This process of optimization may then be taken further. If first and final reference directions are set within the first and final cross sections, an additional reference direction, within some additional cross section between the first and final cross sections, may also be determined independently and all three reference directions used as boundary points. The cross sectional slices between the first and final cross sections then fall naturally into two groups, those between the first and the additional cross sections and those between the additional and the final cross sections. The respective reference directions at either end of these two subsets of cross sections act as boundary reference directions allowing the optimization of the intervening reference directions within each set.

The choice of the original reference direction in the propagation embodiments, or the choice of any of the determined reference directions in the optimization embodiments of the invention, is relatively easy. They may simply by chosen by the user. This would occur for example when the particular anatomy of the structure under consideration rendered specific orientations more useful than others. For example, if the structure were a branching artery, reference directions might be chosen to produce orientations in the final images in which the branching structure of the artery was rendered particularly clearly. If there were no particular visual constraints on the orientations of any of the reference directions then they could be chosen automatically from within the image manipulation system. As an example of how this might be done, it has already been mentioned that it is possible to define a series of mathematical vectors which describe the twisting curve. Armed with such a set of vectors, a reference direction can be chosen to be the mathematical vector which is closest to the nearest axis of a co-ordinate system describing the original object data set. In other words, the problem of finding a first reference direction can be solved mathematically, and methods exist by which this can be done.

These and other aspects of the invention will be further elucidated and described with respect to the drawings.

Figure 1:
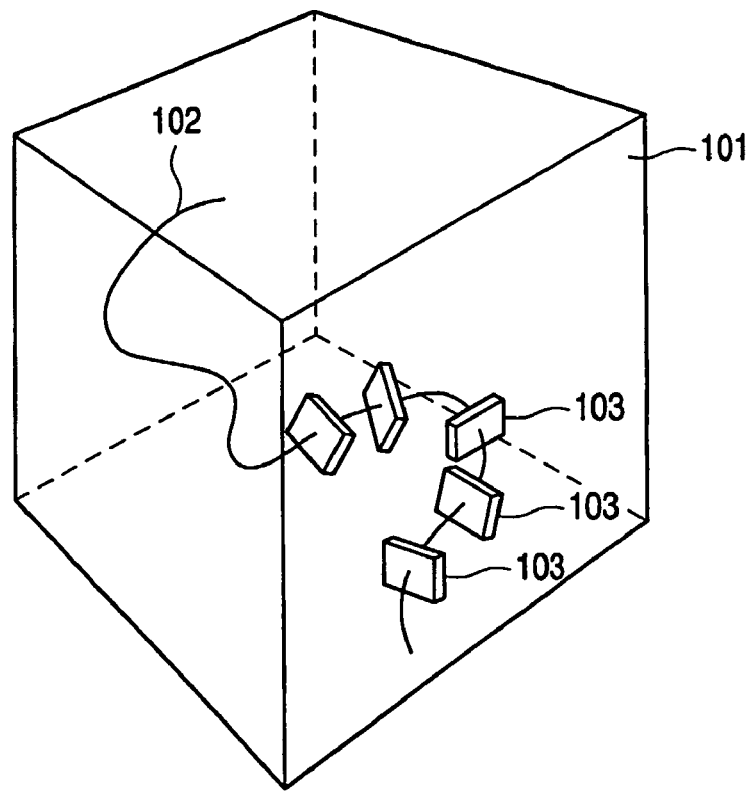
FIG. 1 shows a use of the invention in practice.

FIG. 1 shows a use of the invention within imaging practice. 101 is an object data set containing some tortuous structure 102. In this case 102 might be an artery. Multiple cross sections 103 can be calculated, each containing a small cross section of the tortuous structure 102. The tortuous structure is thus sampled from without the original object data set 101.

Figure 2:
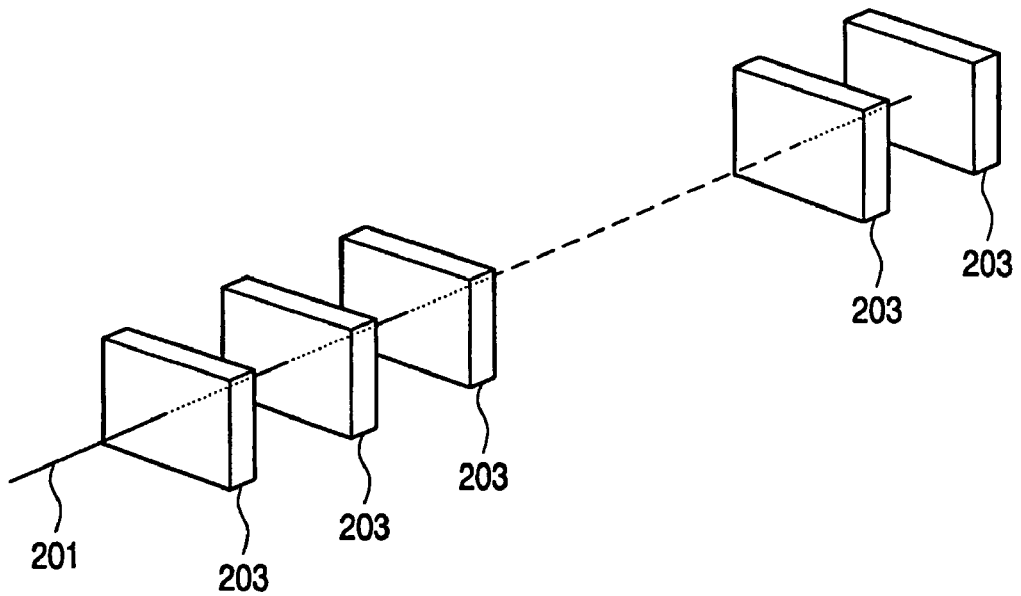
FIG. 2 shows the formation of a new object data set according to the invention.

FIG. 2 shows the formation of the new object data set according to the invention. The tortuous structure, 201, in this case an artery, is reconstructed by reconstructing a new object data set from the concatenation of cross sections 203. The cross sections formed from the original object data set are depicted in these drawings as square. However, this is not a prerequisite of the method. In fact, any shape of cross section may be formed of any size as long as it contains cross sectional information about the tortuous structure in such a way that it can be concatenated with at least one other such cross section.

Figure 3:
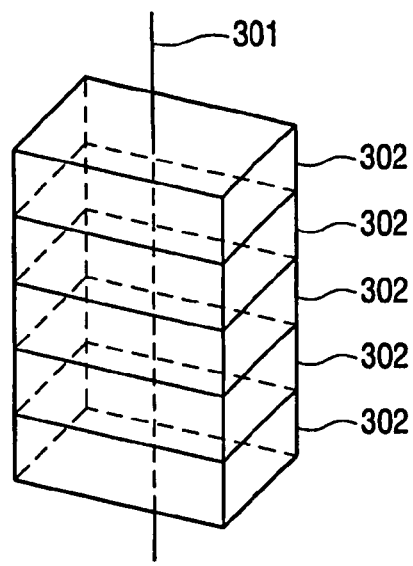
FIG. 3 shows the new object data set according to the invention.

FIG. 3 shows the new object data set reconstructed according to the invention. The original tortuous structure 301 is now reconstructed through the reconstruction of the cross sections 302. This new object data set can now be viewed in the same way as any other object data set. Slices through any part of the new object data set may be formed, it may be subjected to volume visualization techniques and subjected to fly-throughs along the center of the tortuous structure 403.

Figure 4:
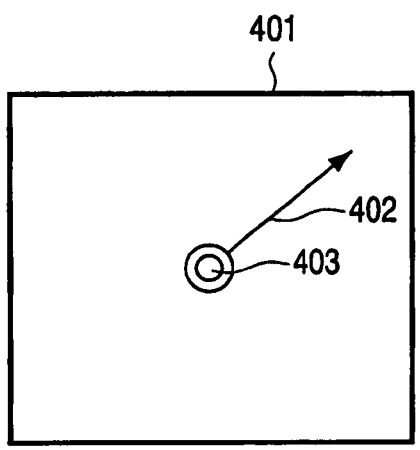
FIG. 4 shows a reference direction oriented within a cross sectional slice, according to the invention.
Figure 4:
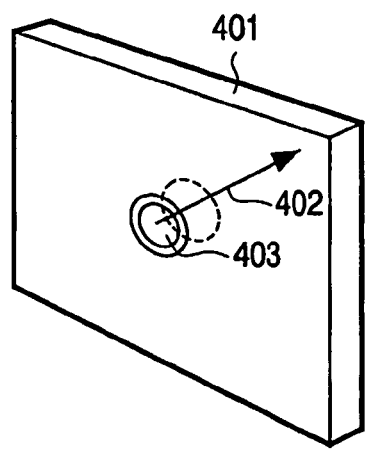

FIG. 4 shows a reference direction 402 oriented within a cross sectional slice 401, according to the invention. The reference direction 402 can mathematically point out any direction about the center of the cross sectional slice 401 containing the portion of the tortuous structure.

Figure 5:
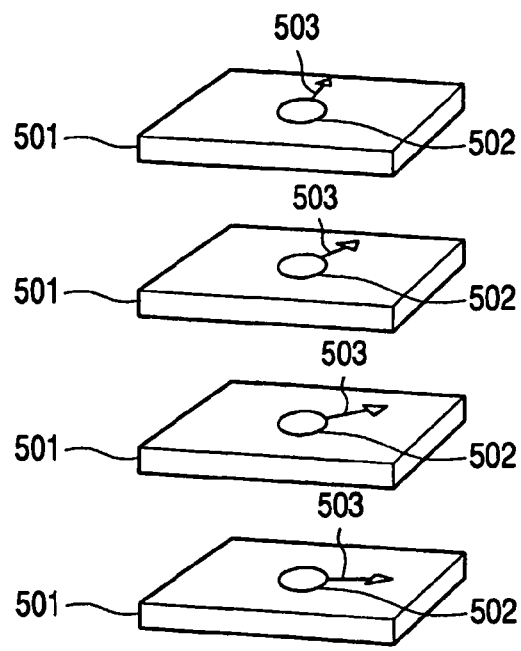
FIG. 5 shows the cross sections in the new object data set with reference directions according to the invention superimposed.

FIG. 5 shows the cross sections in the new object data set with reference directions according to the invention superimposed. The set of cross sectional slices 501 each contain a portion of the tortuous structure 502 and each contains a reference direction 503.

Figure 6:
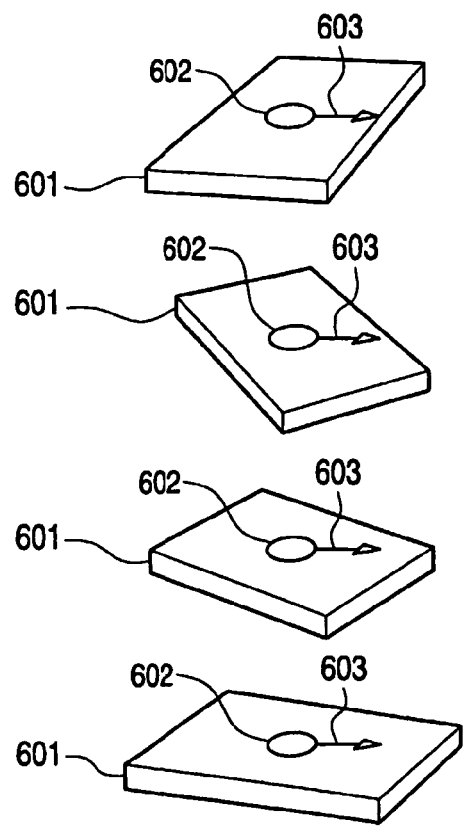
FIG. 6 shows the cross sectional slices reoriented according to the invention so as to bring all the references into line.

FIG. 6 shows the cross sectional slices 601 reoriented about the central portions 602 containing the cross sections of the tortuous structure according to the invention so as to bring all the reference directions 603 into line.

Figure 7:
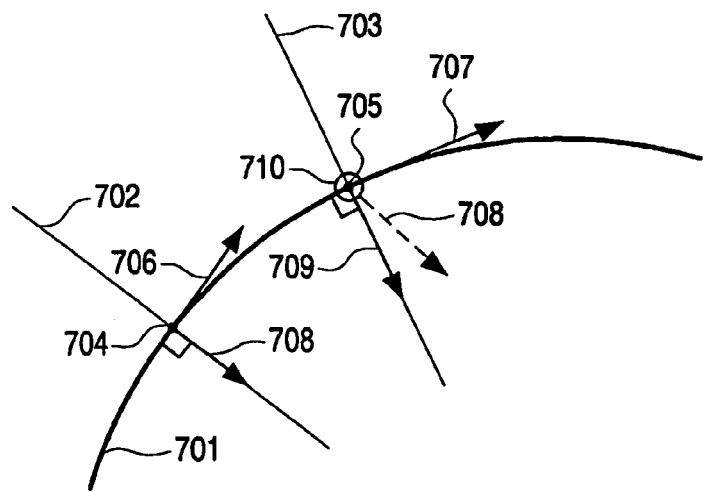
FIG. 7 shows a method for performing the propagation of the reference direction from one cross sectional slice into another, according to the invention.

FIG. 7 shows a method for performing the propagation of the reference direction from one cross sectional slice into another, according to the invention. The Figure shows the method as applied to 2 dimensions. The method can be easily extended to 3 dimensions. A 2 dimensional curve 701 is shown with 2 perpendicular cross sectional slices 702 and 703 crossing the curve at points 704 and 705. A tangent vector can be defined at both these points, vector 706 being the tangent at point 704 on slice 702 and vector 707 being the equivalent at point 705 on slice 703. A representative reference direction 708, a vector, is defined within cross sectional slice 702, originating at point 704 and this is transferred to originate from point 705 in slice 703. Because of the curvature of 701, the vector 708 no longer lies within the slice at 705, viz. 703. A new axis is therefore defined at point 705, being the line perpendicular to the plane containing 707 and point 704. Because the line 701 is constrained to lie within 2 dimensions, the plane containing both 707 and 704 is itself in the same plane as the Figure. This would not necessarily be so if the method were extended to more than 2 dimensions. The new axis is shown as 710 and vector 708 originating at point 705 is rotated around 710 until it lies within the slice 703. In so doing, it becoming the new reference direction 709.

Figure 8:
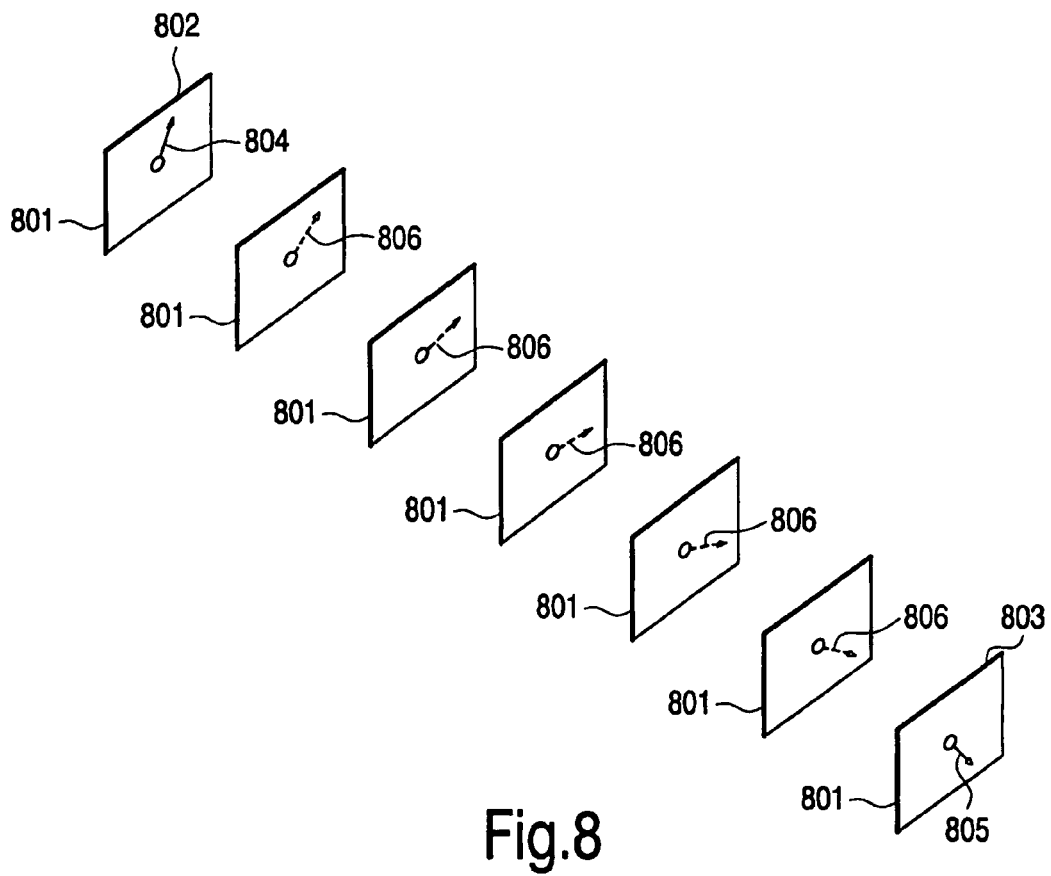
FIG. 8 shows an optimization of the change of reference direction according to the invention.

FIG. 8 shows an optimization of the change of reference direction according to the invention. A catena of cross sectional slices 801 is shown, with the first slice 802 and the final slice 803 containing a first reference direction 804 and a final reference direction 805. These are both used as boundary reference directions. The intervening reference directions 806 are then found by using an optimization strategy which takes 804 and 805 as boundary reference directions.

Figure 9:
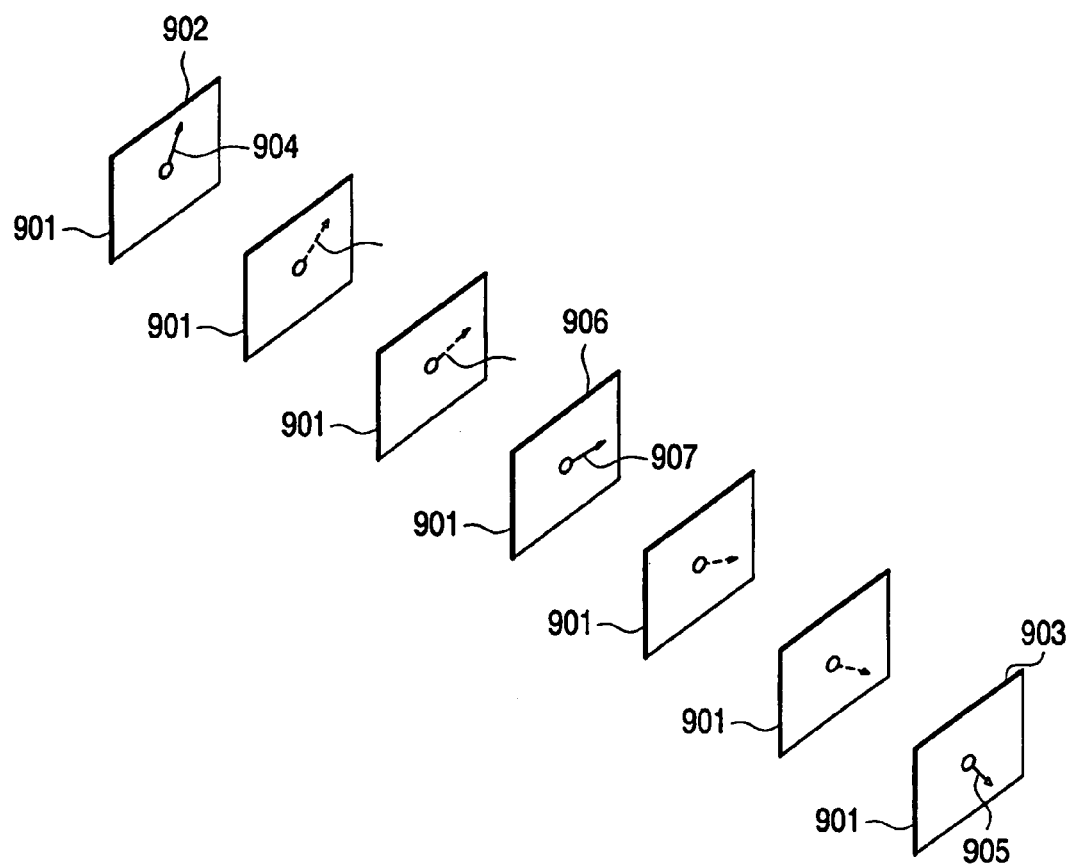
FIG. 9 shows an optimization of the change of reference direction over two subsets of intervening slices, according to the invention.

FIG. 9 shows an optimization of the change of reference direction over two subsets of intervening slices, according to the invention. Here, a similar set of cross sectional slices, 901 are shown with first and final slices 902 and 903 having determined reference directions 904 and 905. Now, however, an additional cross sectional slice 906 in the intervening group of cross sectional slices also has a determined reference direction 907. All the intervening reference directions between 904 and 907 and between 907 and 905 are now found from an optimization strategy which uses the determined reference directions in slices 902, 903 and 906 as boundary conditions.

The result of the invention as described is a new object data set which can be displayed in image form on a screen and examined for useful information about the original sinuous structure. The method of reconstruction retains important original information about the tortuous shape. In particular, the width or diameter of the structure can be more easily viewed when presented as a straightened reformat. If the flexuous structure rendered straight is also tubular and therefore has an internal surface, then the bore, or internal diameter, of the structure can also be more easily viewed using this invention.

The invention thus offers a powerful viewing tool for the visualization of twisting structures within volumes of tissue and the resultant reformulated image data can be manipulated using standard image and volume manipulation techniques. For example, 2 dimensional image slices calculated across the new object data set can be constructed to include longitudinal cross sections of the straightened structure. They can be calculated at a succession of different angles in relation to the information within the new object data set and so can present different views of the straightened structure. A succession of these slices presented continuously would give the impression of the straightened structure rotating and allow the straightened structure to be viewed from a succession of different angular orientations. Attributes such as the thickness of the wall of the structure can now be clearly seen in relation to the rest of the structure. The inherent inventive method allows this to be achieved quite easily. Cross sectional slices, each one containing the axis of the new straightened structure, can be calculated from within the new object data set at a succession of angles relative to the position of the aligned reference directions.

It is from the embodiments through which the reference directions across all cross sections derive their orientations that the invention derives it's power. This invention allows the reconstituted planes which are derived from the original data set to retain some spatial relationship with respect to each other. In this way distortion within the resulting image data is minimized. A tortuous structure which is itself twisting in space twists also in relation to itself As each subsequent cross sectional plane along the twisting axis is reconstructed and stacked on top of the previous one it can potentially be orientated at any angle within the $2\pi$ radians around the axis of the new structure which is formed. But only some orientations of cross sections allow the resulting straightened reformat to preserve the original interesting features inherent in the tortuous object. By mathematically relating the reference direction in each cross sectional slice to some other reference direction in the body of cross sections, the information in the new object data set retains physical consistency.

As an example, if the original tortuous structure were an artery containing some structural mass on some part of the internal wall, it would be expected that for a straightened reformat to be meaningful, successive cross sections including the mass must be oriented relative to each other in such a way as to maintain the topological relationships within the mass and between the mass and the artery wall. Without having detailed knowledge of the structure of the tortuous object it is reasonable to assume that there exists some specific orientation of cross sections which, when adopted, will maximize the retention of original topographical information, but without a complete knowledge of the arrangement and structure of the tortuous object, it is frequently impossible to tell what these exact orientations should be. Without this a priori information, any plane which is reconstructed and stacked on top of the previous one in a straightened reformat image may conceivably be placed at any angle within $2\pi$ about the axis of the tortuous structure which forms the basis of the reconstruction. In the case of the artery with the adherent internal mass, this has the potential to produce discontinuities in the representation of the physical structure with portions of the mass becoming shifted around from each other in the final reconstruction and vital visual information consequently becoming obscured. If such an image were used for diagnostic purposes an error might occur. If, however, a mathematical relationship exists between the orientations of the cross sections, and this invention achieves this through use of the reference directions and their relationship to each other, the cross sectional slices in the new object data set are constrained to an alignment which retains the relationship of the original information being represented. In the case of the artery, successive slices retain a relative orientation to each other and the reconstruction retains topological relationships within the mass and between the mass and the artery wall.

The ability to optimize intervening reference directions in relation to fixed, chosen reference directions allows the invention to handle images containing branching structures. Using the invention, a branching artery can be straightened out and the relative orientations of the branches brought into line by the viewer. If the viewer fixes the direction of the reference directions at two end points and any intervening point, to include say, any branching points, the invention then straightens out and untwists the image of the intervening tissue in relation to the chosen points. The resulting object data set will contain the relative orientations of the branching points in one plane. This may be applied to any number of branching points in succession as an optimization process can be applied to any number of subsets of intervening cross sections, as long as the two reference directions at either end of the succession of cross sections have been determined. Indeed, any or both of the end point reference directions can also be a reference direction for a branching point.

The utility of the invention allows further application to different imaging problems. For example, reconstruction of successive cross sectional slices using related reference directions allows the reconstruction of a tubular structure for the purposes of internal visualization. An example of this is the reconstruction and manipulation of volume data describing colon tissue. Techniques for this are so sophisticated that a fly-through can now be performed, that is, a succession of images presented to the viewer which give the viewer the impression of travelling internally through the length of colon. This is a useful tool in diagnosis. The method of the invention may be applied to the colon reconstruction methods to produce a fly-through with reduced changes in angular orientation as the visualized colon is traversed, that is, a fly-through can be produced which produces less of a sensation of sea sickness in the viewer.

The invention claimed is:

1. A method of producing an object data set describing a straightened reformat from an original object data set containing an elongated subject, from which an initial cross sectional slice is created transverse to the elongated subject and at least one further cross sectional slice is created transverse to the elongated subject, the method comprising:
   determining with a processor a reference direction in each cross sectional slice; and
   creating the object data set by concatenating the cross sectional slices, each cross sectional slice being orientated so that the reference directions in the cross sectional slices are aligned.

2. The method as in claim 1, wherein determining the reference direction in each cross sectional slice comprises:
   determining an initial reference direction in the initial cross sectional slice, and
   deriving a reference direction in the at least one further cross sectional slice from the initial reference direction by propagation.

3. The method as in claim 2, wherein the determined initial reference direction is propagated directly into each of the at least one further slice.

4. The method as in claim 2, wherein the initial and the at least one thither cross sectional slices from a consecution of successive cross sectional slices and the reference direction in each of the at least one further cross sectional slice is derived from the reference direction in a preceding slice by propagation.

5. The method as in claim 1, wherein determining the reference direction in each cross sectional slice comprises:
   determining a first reference direction in the initial cross sectional slice,
   independently determining a final reference direction in a final cross sectional slice, so that there is at least one intervening cross sectional slice between the initial and the final cross sectional slices,
   deriving the reference direction in each of the at least one intervening cross sectional slice by optimizing a change of reference direction throughout the at least one intervening cross sectional slice while using the reference directions in the initial and final cross sectional slices as boundary conditions.

6. The method as in claim 5, wherein the change of reference direction is optimized by minimizing a change in relative orientation between the reference directions of consecutive cross sectional slices from the first reference direction in the initial cross sectional slice to the final reference direction in the final cross sectional slice.

7. The method as in claim 5, wherein an additional cross sectional slice is chosen from the at least one intervening cross sectional slice between the initial and the final cross sectional slices, an additional reference direction is determined in the additional cross sectional slice, the reference directions in the intervening cross sectional slices between the initial and the additional cross sectional slice and between the additional and the final cross sectional slices are derived by optimizing the change of reference direction throughout the cross sectional slices while using the first, additional and final reference directions as boundary conditions.

8. The method as in claim 1, further comprising:
   aligning the cross sectional slices within the object data set describing the straightened reformat in such a way that their respective reference directions are at the same angular orientation within the object data set.

9. The method as in claim 1, further comprising:
   displaying object data set describing the straightened reformat.

10. The method as in claim 1, wherein creating the object data set includes stacking the cross sectional slices one on top of another.

11. The method of claim 1, wherein each of the cross sectional slices is approximately centered around the elongated object.

12. The method of claim 1, wherein the reference directions for at least two of the cross sectional slices are angularly offset from each other.

13. The method as in claim 12, wherein creating the object data set includes orienting the at least two cross sectional slices to align the reference directions of the at least two cross sectional slices.

14. A method of creating an object data set describing a straightened reformat from an original object data set containing an elongated subject, the method comprising:
   creating with a processor a plurality of cross sectional slices transverse to the elongated subject;
   determining a plurality of reference directions corresponding to the plurality of cross sectional slices, including determining an initial reference direction associated with an initial cross sectional slice of the plurality of cross sectional slices and deriving reference directions corresponding to remaining cross sectional slices of the plurality of cross sectional slices from the initial reference direction by propagation;
   concatenating the plurality of cross sectional slices; and
   aligning the plurality of reference directions corresponding to the plurality of cross sectional slices,
   wherein the plurality of cross sectional slices from a consecution of successive cross sectional slices, and the reference directions corresponding to the remaining cross sectional slices are each derived from the reference direction corresponding to a preceding cross sectional slice by propagation.

15. A method of creating an object data set describing a straightened reformat from an original object data set containing an elongated subject, the method comprising:

creating with a processor a plurality of cross sectional slices transverse to the elongated subject;

determining a plurality of reference directions corresponding to the plurality of cross sectional slices;

concatenating the plurality of cross sectional slices; and aligning the plurality of reference directions corresponding to the plurality of cross sectional slices, wherein determining the plurality of reference directions comprises:

determining a first reference direction corresponding to a first cross sectional slice of the plurality of cross sectional slices;

independently determining a final reference direction corresponding to a final cross sectional slice of the plurality of cross sectional slices, at least one intervening cross sectional slice being between the first cross sectional slice and the final cross sectional slice; and deriving a plurality of intervening reference directions corresponding to a plurality of intervening cross sectional slices by optimizing changes associated with the intervening reference directions, using the first reference direction and the final reference direction as boundary conditions.

16. The method of claim 15, wherein optimizing the changes associated with the intervening reference directions comprises minimizing a change in relative orientation between the reference directions of consecutive cross sectional slices from the first reference direction corresponding to the first cross sectional slice to the final reference direction corresponding to the final cross sectional slice.

17. The method of claim 15, further comprising:

selecting an additional cross sectional slice from the plurality of intervening cross sectional slices and determining an additional reference direction corresponding to the additional cross sectional slice, wherein the intervening reference directions corresponding to the remaining intervening cross sectional slices between the first cross sectional slice and the additional cross sectional slice and between the additional cross sectional slice and the final cross sectional slice are derived by optimizing changes associated with the intervening reference directions, using the first reference direction, the additional reference direction and the final reference direction as boundary conditions.

18. A method of creating an object data set describing a straightened reformat from an original object data set containing an elongated subject, the method comprising:

creating with a processor an initial cross sectional slice and at least one further cross sectional slice transverse to the elongated subject;

determining a reference direction in each cross sectional slice;

concatenating the cross sectional slices; and aligning the cross sectional slices within the object data set describing the straightened reformat in such a way that the respective reference directions ale at the same angular orientation within the object data set.

19. The method of claim 18, wherein determining the reference direction in each cross sectional slice comprises:

determining an initial reference direction in the initial cross sectional slice, and deriving a reference direction in the at least one further cross sectional slice horn the initial reference direction by propagation.

20. The method as in claim 19, wherein the determined initial reference direction is propagated directly into each of the at least one further cross sectional slice.

* * * * *